United States Patent
Pereira et al.

(10) Patent No.: US 8,173,086 B2
(45) Date of Patent: May 8, 2012

(54) PROCESS OF RECOVERY OF BASE METALS FROM OXIDE ORES

(75) Inventors: Antonio Clareti Pereira, Rio de Janeiro-RJ (BR); Tiago Valentim Berni, Rio de Janeiro-RJ (BR)

(73) Assignee: Vale S.A., Rio de Janeiro-RJ (BR)

( * ) Notice: Subject to any disclaimer, the term of this patent is extended or adjusted under 35 U.S.C. 154(b) by 0 days.

(21) Appl. No.: 12/835,455

(22) Filed: Jul. 13, 2010

(65) Prior Publication Data
US 2011/0142736 A1    Jun. 16, 2011

Related U.S. Application Data

(60) Provisional application No. 61/225,264, filed on Jul. 14, 2009.

(51) Int. Cl.
    *C01G 1/00* (2006.01)
(52) U.S. Cl. .................. 423/138; 423/140; 423/150.1; 423/155; 423/25; 423/34
(58) Field of Classification Search .............. 423/138, 423/140, 150.1, 155, 25, 34
    See application file for complete search history.

(56) References Cited

U.S. PATENT DOCUMENTS

| | | | | |
|---|---|---|---|---|
| 5,571,308 A | * | 11/1996 | Duyvesteyn et al. | ........... 75/430 |
| 2004/0228783 A1 | * | 11/2004 | Harris et al. | ................. 423/140 |

* cited by examiner

*Primary Examiner* — Melvin Mayes
*Assistant Examiner* — Melissa Stalder
(74) *Attorney, Agent, or Firm* — Arent Fox, LLP

(57) ABSTRACT

A method for recovering base metal values from oxide ore is provided, where the ore includes a first group metal selected from iron, magnesium and aluminum and a second group metal selected from nickel, cobalt and copper. The method includes reducing ore particle size to suit the latter unit operations, favoring contact of the metal elements, contacting the ore with ferric or ferrous chloride, hydrated or anhydrous, to produce a mix of ore and iron(II or III) chloride, subjecting the mixture of the ore and ferric or ferrous chloride to enough energy to decompose the chlorides into hydrochloric acid and a iron oxide, contacting the readily-formed hydrochloric acid with the base metal oxides from the second group, forming their respective chlorides, selectively dissolve the produced base metal chlorides, leaving the metals as oxides and in the solid state, and recovering the dissolved base metal values from aqueous solution.

16 Claims, 3 Drawing Sheets

PROCESS OF RECOVERY OF BASE METALS FROM OXIDE ORES

RELATED APPLICATION

This application claims priority from U.S. provisional patent application No. 61/225,264, titled "Method for Extraction of Base Metal Value from Oxide," filed on Jul. 14, 2009, and which is incorporated by reference herein in its entirety.

BACKGROUND OF THE INVENTION

1. Field of Invention

The present disclosure relates to recovery of base metal values, such as nickel, cobalt, copper and the like, from oxide type materials.

2. Description of Related Art

There are several methods available to those skilled in the art for the extraction of nickel and other base metals from oxide ores, and especially from laterites. These conventional methods generally have several disadvantages that render producing nickel from laterites a difficult task.

The choice of a hydrometallurgical route for nickel laterites is highly dependent on ore characteristics because no conventional process can be generally applied thoroughly. Parameters such as flexibility, high recovery, and savings of energy, reagents and water are not only desired, but are essential to a viable hydrometallurgical plant. There are several leaching options available for nickel laterites, such as the Caron process (roasting/reducing/ammonia-based leaching) or the pressure acid leaching (PAL or HPAL—high pressure acid leaching), but these leaching options are generally associated with high operational and capital costs. There are other options being developed, trying to reduce those costs, such as atmospheric acid leaching in agitated tanks or heap leaching (McDonald and Whittington, 2007; Whittington, McDonald, Johnson and Muir, 2002).

Even though there are commercially available hydrometallurgical options for nickel laterites and plenty of development in the field with good technical background, these options are still costly. High capital and economical costs are related to the number and complexity of unit operations that are currently needed for nickel extraction and their complexity. Researchers have been struggling to find solutions for issues such as high acid consumption, impurities extraction, solid/liquid separation, among others. Hydrometallurgical purification of nickel often deals with high volumes and low concentration of valuable metals, thus considerably increasing overall operational costs.

High acid consumption is one of the main components of operational costs of laterite leaching. Nickel and the other base metals are usually bonded in ferruginous ores, as in limonites, or in saprolite matrixes, both being rich in magnesium. Accordingly, in order to effectively leach those elements, iron and magnesium need to be leached, both iron and magnesium being available in high amounts and thus increasing overall acid consumption. That is the main issue with conventional atmospheric or heap leaching operations, as seen throughout the available literature, for example in patent applications WO/2010/000029, WO/2009/146518, WO/2009/018619, EP1790739 and many others. An excess of acid is needed to achieve high extractions of payable metals. It is known for those skilled in the art that high pressure acid leaching (PAL or HPAL) can deal with the high ferruginous ores, as all iron is hydrolyzed, but magnesium remains an issue.

Document WO 2010000029 (BHP Billiton SSM) teaches a process for the recovery of nickel and cobalt from a nickeliferous oxidic ore by heap leaching and/or atmospheric agitation leaching, the process generally including mixing a sulfur containing reductant selected from reductants that do not include copper into a nickeliferous oxidic ore, leaching the reductant/ore mixture with an acidic leach reagent to produce a pregnant leach solution including nickel, cobalt, iron substantially in a ferrous form and other acid soluble impurities, and recovering the nickel and cobalt from the pregnant leach solution.

WO 2009146518—(VALE S.A.) describes a process of recovering nickel and cobalt and regenerating the main raw materials, the process including granulometric separation, leaching, neutralization, mixed hydroxide precipitate (MHP) production in only one stage and the pressure crystallization of magnesium sulphite. The process proposes a way to recover nickel and cobalt from laterite ores through atmospheric and heap leaching with staged addition of ore—by size separation—and $H_2SO_4$, decreasing the nickel losses, simplifying the neutralization circuit and producing a more purified MHP. The present process route is employed for nickel extraction, including the one from high magnesium containing lateritic ores.

WO 2009 018619 (BHP Billiton SSM) describes an atmospheric leach process in the recovery of nickel and cobalt from lateritic ores, the process including providing limonitic and saprolitic ore fractions of a laterite ore, separately slurrying the limonitic and saprolitic ore fractions to produce a limonitic ore slurry and a saprolitic ore slurry, separating any limonitic type minerals from the saprolitic ore slurry to produce a saprolitic feed slurry, milling or wet grinding the saprolitic feed slurry, leaching the limonitic ore slurry with concentrated sulfuric acid in a primary leach step, introducing the saprolitic feed slurry to the leach process in a secondary leach step by combining the saprolitic feed slurry with the leached limonite slurry following substantial completion of the primary leach step, and releasing sulfuric acid to assist in leaching the saprolite feed slurry, wherein the saprolitic feed slurry is substantially free of all limonitic type minerals before it is introduced to the leach process.

EP 1790739 (Companhia Vale do Rio Doce) teaches a process for extraction of nickel, cobalt, and other metals from laterite ores by heap leaching, and of the product obtained as well, characterized by the fact that it is comprised of crushing, agglomeration, stacking and heap leaching stages, with this last stage being a continuous, countercurrent, heap leaching system with two or more stages, comprised of two phases, one of which is composed of the ore, or solute, and the other is composed of the leaching solution, or solvent, which are supplied at opposite ends of the series of stages and flow in opposite directions. Upon cessation of leaching in the last stage, its solute is removed and a new stage is introduced at the first position, formed by new ore to be leached by the solvent solution, which is introduced from the last stage, percolating or flowing through all the previous stages until it reaches the first stage, being separated if loaded with target metals.

Another issue with acid leaching of oxide base metals ores is neutralization and solid-liquid separation. A neutralizing agent, such as, but not limited to, lime, limestone or magnesia, is needed to increase solution pH and hydrolyze some impurities from solution. This operation produces hydroxides, as ferric hydroxides, that make solid-liquid separation very onerous. Rheology is often a problem too. To avoid that problem, high dilution of the solution is needed, and higher volumes of poorer solution are needed to be purified.

Effluent treatment could also be an issue, as magnesium levels can be prohibitive. There are several methods for removing magnesium from solution, but all come with a high cost. Solid residue is also not very stable and needs large tailings ponds.

One patent application, WO/2009/026694, from Berni et al, attempts to address the above-discussed issues by contacting HCl gas and oxide ore. This patent application uses the fact that iron, aluminum and magnesium chlorides can be selectively decomposed from payable metals, then recovering HCl and producing a much cleaner solution to treat and that is free of iron, magnesium, manganese or aluminum. This technique also produces a stable solid residue and in smaller quantity.

The major hurdle on HCl usage for base metals extraction has normally been focused on the need to use highly corrosion resistant materials and to control hydrogen chloride gas emissions.

Gybson and Rice (1997) showed the advantages of hydrochloric acid usage for nickel laterite extraction. There is substantial literature examining the use of hydrochloric acid and several new processes proposed in recent years based upon novel chemistry only achieved in strong chloride liquors.

SUMMARY

Various aspects of the present invention bring a controlled process that promotes in-situ generation of HCl, reducing corrosion problems, thus reducing capital costs. Ferric or ferrous chloride is agglomerated with the ore and later submitted to selective hydrolysis of the iron chloride. The agglomeration and hydrolysis depend on the iron oxidation stage and generates in-situ HCl that attacks base metals oxides, forming metal chlorides. These chlorides are later solubilized in water, generating an iron and aluminum-free leach effluent. This effluent can then be submitted to any known and more simplified purification technology because there is no longer a need for an iron removal stage.

Aspects of this invention reduce the impact of using direct HCl to leach oxide ores by indirect hydrochlorination using ferric or ferrous chloride. As a result, the use of HCl is limited to a smaller unit operation, reducing overall costs and maintenance.

A method for recovering base metal values from oxide ores is provided according to various aspects of the current invention. According to various aspects, the ore includes a first metal selected from the group consisting of at least one of iron, magnesium and aluminum and a second metal selected from nickel, cobalt and copper. The method may include the steps of reducing ore particle size to suit the latter unit operations, favoring contact of the metal elements, contacting the ore with at least one of ferric or ferrous chloride, hydrated or anhydrous, to produce a mix of ore and iron(II or III) chloride, subjecting the mixture of the ore and ferric or ferrous chloride to enough energy to decompose the chlorides into hydrochloric acid and a iron oxide, preferably hematite, contacting the readily-formed hydrochloric acid with the base metal oxides from the second group described above, forming their respective chlorides, and selectively dissolve the produced base metal chlorides, leaving the metals from the first group as oxides and in the solid state. The method may also include methods of recovering the dissolved base metal from aqueous solution.

DETAILED DESCRIPTION OF THE INVENTION

Aspects of the present invention relate to a process for recovering base metal values from oxide materials, specifically metals found, e.g., in laterite ores, such as nickel, cobalt and copper.

In accordance with aspects of the present invention, oxide materials such as, for example, laterite ores, are mixed with ferric or ferrous chloride to produce an iron, aluminum and magnesium-free solution that carries base metals chlorides, such as nickel, cobalt and copper, through indirect hydrochlorination, as described by equations (1) to (3) below.

Figure 1:
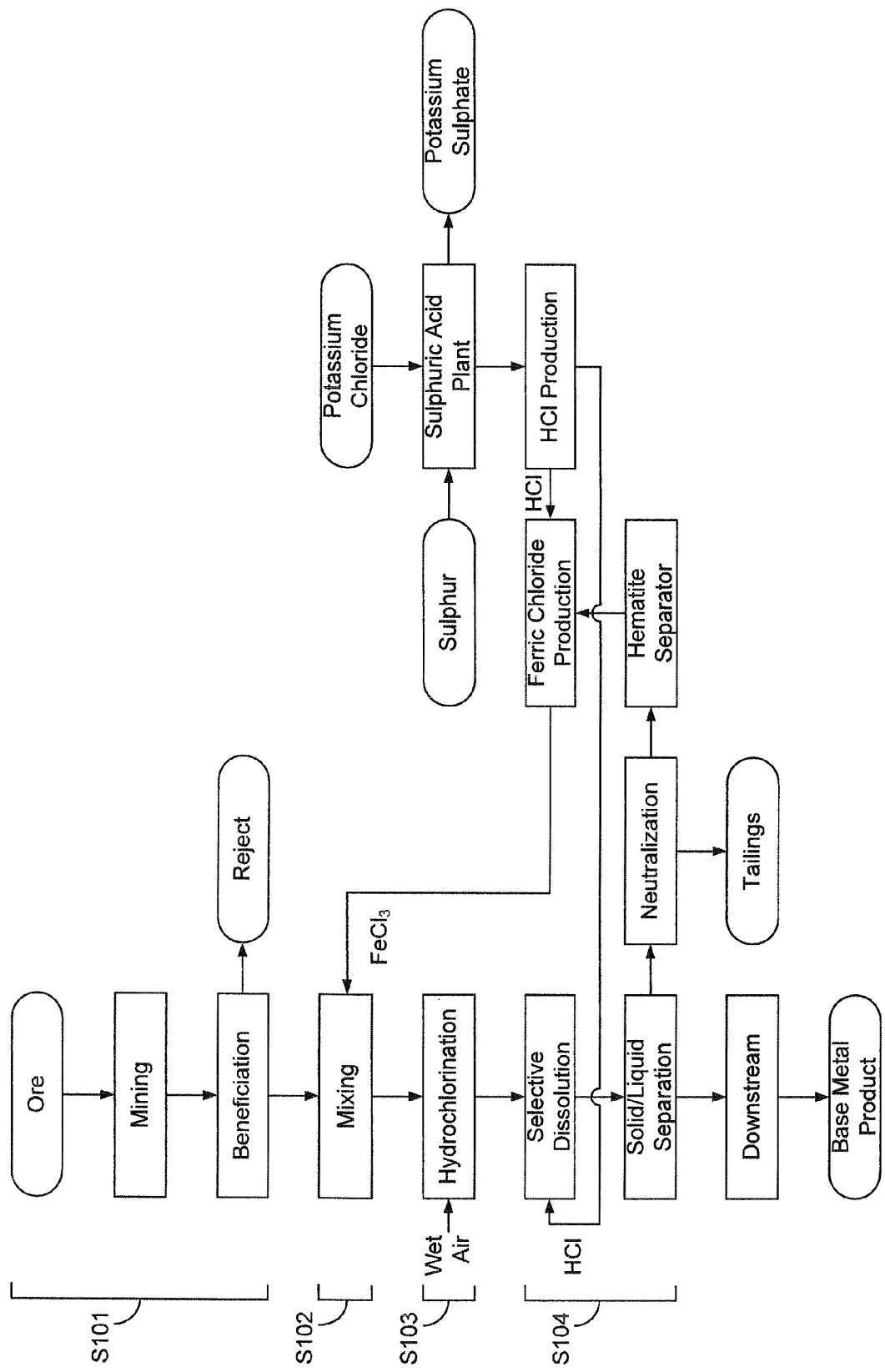
FIG. 1 is an illustration of a method for extracting base metals from laterite ore, according to various aspects of the present invention.
Figure 2:
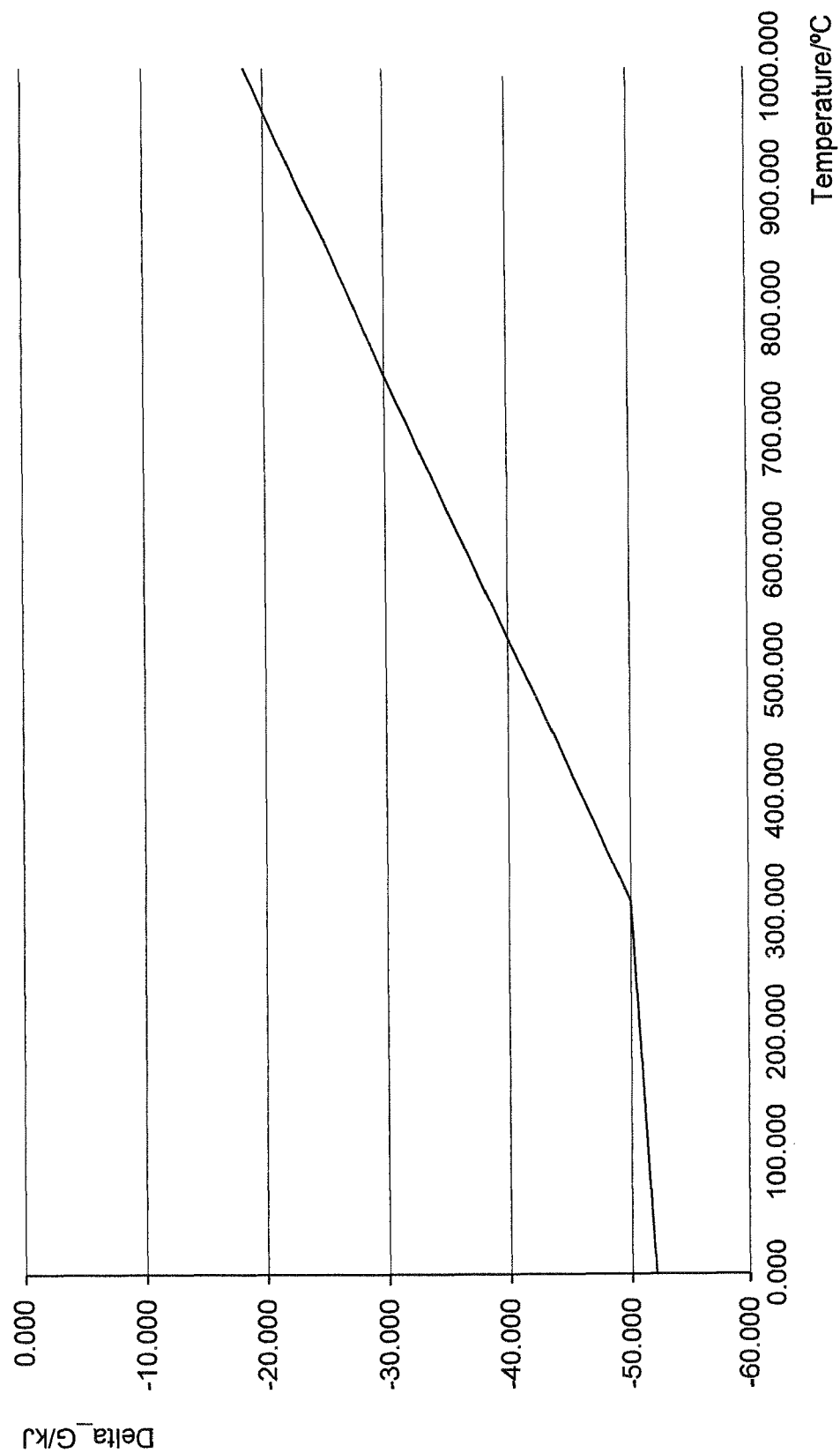
FIG. 2 is a graph illustrating Gibbs free energy behavior with temperature for indirect hydrochlorination utilizing ferric chloride, according to various aspects of the present invention.
Figure 3:
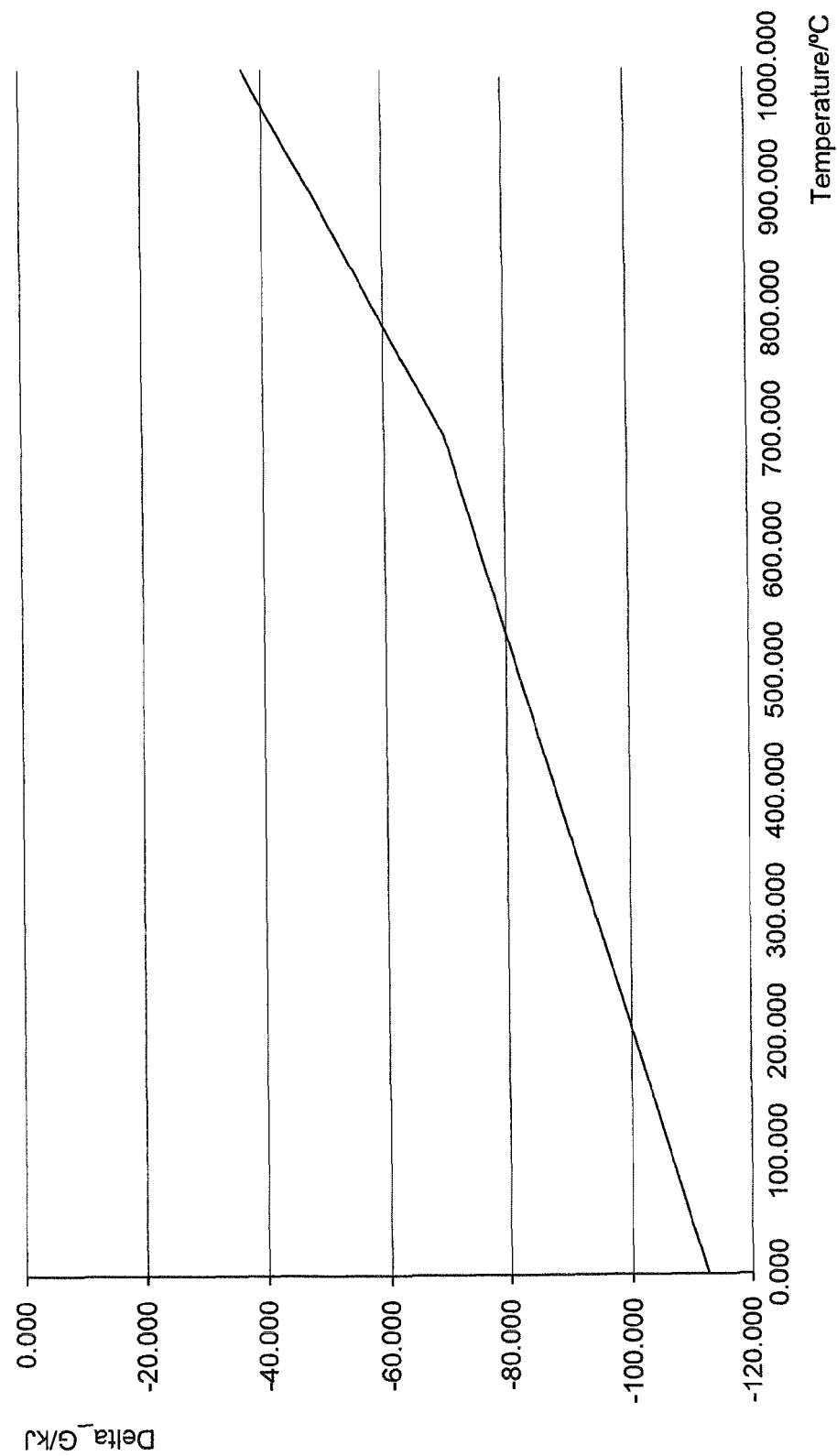
FIG. 3 is a graph illustrating Gibbs free energy behavior with temperature for indirect hydrochlorination utilizing ferrous chloride, according to various aspects of the present invention.

FIG. 1 is an illustration of a method 100 for extracting base metals from laterite ore, according to various aspects of the present invention. As described in more details below with respect to FIG. 1, the oxide material may be initially crushed or granulated to liberate the oxide base metals prior to mixing with ferric or ferrous chloride, as indicated in step S101. The particle reduced oxide material may be mixed with ferric or ferrous chloride and agglomerated with a mineral acid if necessary, as indicated in step S102. According to various aspects, the mix of particle-reduced ore and ferric or ferrous chloride is contacted with enough wet air at high temperature to convert base metals into chlorides and iron, and aluminum and magnesium to their respective oxides, as indicated in step S103. Gibbs free energy behavior for hydrochlorination with using both ferric chloride and ferrous chloride is illustrated in FIGS. 2 and 3. To obtain an iron-, aluminum- and magnesium-free solution, water may be added to the converted ore at a pH of between about 8 and 2. The pH can be controlled using a mineral acid such as, for example, hydrochloric acid, in order to avoid the newly formed oxides from leaching.

In accordance with aspects of the present invention, after solid-liquid separation such as illustrated in step S104, the solution becomes therefore iron-, aluminum- and magnesium-free. The solubilized base metals can then be purified into sellable products by various methods known by those skilled in the art. The solid portion of the solid liquid separation, after proper washing of residual solution, may be submitted to a high intensity magnetic separation to separate hematite from other oxides. Neutralization may optionally be needed. Hematite may then be contacted with hydrochloric acid to produce ferric chloride and water. In order to produce ferrous chloride, a reducing agent, such as, but no limited to, iron may be added to the system.

In accordance with aspects of the present invention, ore is extracted from the mine to provide beneficiation plant a run-of-mine. The run of mine may then be prepared to be fed into the extraction plant. For that, it is preferable that the size of the ore is reduced to an appropriate size to liberate base metals oxides for proper indirect hydrochlorination and efficient solubilization. In accordance with aspects of the present invention, ore size may be kept between 2 mm and 0.050 mm, and optionally less than 0.5 mm. These sizes can be obtained by different conventional unit operations well known and described in the literature, such as, but not limited to, crushing and grinding. Ore may be separated in two fractions: a first one that is rich in nickel and having about the sizes described above, and another one that is poor in nickel. The fraction of ore that is poor in nickel may be discarded. It should be noted that the above-discussed fractions and sizes are exemplary, and those skilled in the art may provide more or less fractions of varying sizes.

In accordance with aspects of the present invention, after size reduction, the ore is mixed or agglomerated with ferric or ferrous chloride sufficient for total hydrochlorination of payable base metals. Ferric or ferrous chloride can be added in the ratio between, for example, 0.05 and 1.5 times the ore mass, and optionally between 0.1 and 0.5 times the ore mass. Water or a mineral acid may optionally also be added to improve agglomeration. If ferrous chloride is used, an oxidizing agent may also be added to the ore, such as, but not limited to, oxygen, potassium permanganate, ozone or hydrogen peroxide. The oxidizing agent may be added in a similar mass ratio range as ferrous chloride. It should be noted that ferric or ferrous chloride may be obtained by any available source.

In accordance with aspects of the present invention, the oxidizing agent reacts with ferrous chloride, forming hematite and HCl, as shown by the reaction below.

$$2FeCl_2 + 1/2 O_2 + 2H_2O \rightarrow Fe_2O_3 + 4HCl \qquad (1)$$

In accordance with aspects of the present invention, the temperature range needed for this reaction ranges may be between 60° C. and 600° C., optionally between about 100° C. and about 300° C. for kinetics reasons. Residence time may range between 0.5 hour and 12 hours, optionally between 1 hour and 2 hours.

When using ferric chloride, an oxidizing agent may not be necessary. The properly agglomerated ore is taken to a hydrolysis stage, usually but not limited to a kiln, where the ore is submitted to conditions under which ferric and/or ferrous chloride is decomposed, producing stable hematite or other hydrated iron oxide, and HCl. During this step, the agglomerated ore is then submitted to elevated temperature, ranging between 60° C. to 600° C., for between a minimum of about 5 minutes and a maximum of about 24 hours. Sufficient water may need to be added, but enough water may already be present in ore moisture.

The decomposition reaction of the ferric chloride can be described as shown below.

$$2FeCl_3 + 3H_2O \rightarrow Fe_2O_3 + 6HCl \qquad (2)$$

The temperature range needed for this second reaction mechanism may ranges between 60° C. and 600° C., and optionally around 150° C. to 350° C. Residence time requirements may be the same as the residence time requirements for ferrous chloride.

Accordingly, it is clear from the reactions expressed by equations (1) and (2) that enough water must be provided to the system in order to ensure proper hydrolysis. Ore-free moisture may thus be controlled to be between 1% and 20% (m/m), and water vapor may also be added to the system in order to provide enough water.

The HCl generated as described above in equations (1) and (2), inside the agglomerated ore, is used to form value base metal chlorides, as shown below for a generic transition metal M that forms an oxide MO:

$$MO + 2HCl \rightarrow MCl_2 + H_2O \qquad (3)$$

According to various aspects of the current invention, the newly formed chlorides are soluble in water, but the metal M such as iron, aluminum and magnesium is already in a stable form as an oxide. Accordingly, equation (3) would yield an iron, magnesium and aluminum-free effluent, easily purified by various methods available in the literature and known by those skilled in the art.

According to various aspects of the current invention, after hydrochlorination as described before is terminated, the ore could be stacked in a heap and leached with acidified water, with a pH of at least 7. Any mineral acid may be used such as, for example, sulfuric acid, nitric acid or hydrochloric acid. According to various aspects, the acid content may be increased up 100 g/L, but the pH may be kept between about 1 and about 3. Leaching solution could be recycled, with acid make-up, to increase payable metals concentration. Another possible way of solubilizing the payable metals is through agitated tanks, keeping pH at the same ranges. Residence times may be determined to be between about 5 minutes and about 24 hours, and optionally between 30 minutes and 120 minutes. Also, the solution may be heated to increase solubilization kinetics, and the percentage of solids may be kept between about 5% and about 50%, depending on how concentrated the solution needs to be. Optionally, the percentage of solids may be in the range 15% and 35%. It should be noted that any other form of solubilization known by those skilled in the art may also be employed.

According to various aspects of the current invention, after proper solubilization and solid-liquid separation, any method of downstream purification may be used. According to various aspects, there is no need of an iron removal stage and an aluminum removal stage, or of effluent treatment for magnesium or manganese removal, because these elements were already stabilized as oxides in the furnace.

According to various aspects of the current invention, tailings produced from the solid-liquid separation may be contacted with a high intensity magnetic field, after first been washed to remove residual base metals solution. Neutralization may also be needed, but may not be necessary. The magnetic field separates hematite from other oxides. It should be noted that other separation methods, known from those skilled in the art, can be used instead of a magnetic separator.

According to various aspects of the current invention, in order to produce ferric or ferrous chloride, hematite may be contacted with hydrochloric acid, producing the chosen iron chloride, as described by equations below:

$$Fe_2O_3 + 6HCl \rightarrow 2FeCl_3 + 3H_2O \qquad (4)$$

$$Fe_2O_3 + Fe + 6HCl \rightarrow 3FeCl_2 + 3H_2O \qquad (5)$$

It should be noted that any reducing agent may be used to form ferrous chloride, such as, for example, metal iron (Fe). Ferric chloride may also be produced by contacting metal iron with hydrochloric acid in oxidizing conditions. Hydrochloric acid may be produced by reacting a chloride salt, such as sodium chloride, potassium chloride, with an acid, such as sulfuric acid. According to various aspects, potassium chloride may be used as a chloride salt. Reacting potassium chloride with sulfuric acid produces dry hydrochloric acid (e.g., free of water) and potassium sulfate, a useful byproduct.

According to various aspects of the current invention, one of the advantages of this technology is that HCl is used in a controlled form, reducing the need for expensive equipments, Cheaper construction materials and simpler equipments are needed. Gas-solid interaction is not a big concern because HCl is generated within the agglomerated ore, diffusing throughout the material. That way, a simple kiln such as, but not limited to, a rotary kiln, can be employed at the hydrolysis stage, thus reducing capital costs. Downstream equipments are also simpler because no high chloride solution will be produced.

Various aspects of the process according to the current invention provide the advantage of base metal extraction with chlorides while reducing one of its drawbacks which is the need of special engineering and materials of construction.

Further, the following features can also summarize the benefits of various aspects of the present invention: i) increased extraction of value metal, such as copper, nickel and cobalt; ii) better deposit exploitation; iii) reduced acid consumption; iv) better settling properties of pulp; v) reduced consumption of flocculants; vi) no need for saprolite/limonite separation; vii) controlled HCl usage; viii) simple engineering; ix) simple operation; and x) reduced capital costs. The following examples are illustrative of the experimental process according to various aspects of the current invention:

EXAMPLE 1

100 g of a limonite-type ore is mixed with a laterite ore comprising 1.03% Ni, 35.06% Fe, 12% Si, 4.05% Mg, 1.94% Al, 0.64% Mn and 0.065% cobalt, and with 10 g of ferric chloride hexahydrated for 180 minutes and 400° C. Extraction results are in Table 1 below.

TABLE 1

Extraction Results for Example 1
Element Extraction

| Al | Co | Fe | Mg | Mn | Ni |
|---|---|---|---|---|---|
| 0.10% | 98.10% | 0.50% | 0.30% | 0.40% | 95% |

EXAMPLE 2

A laterite charge is subjected to a 90 minute indirect hydrochlorination at 300° C. with wet air injection. The sample contains 2.01% Ni, 0.073% Co, 49.1% Fe, 3.07% Mg and 06% $SiO_2$. Extraction results are show in Table 2 below.

TABLE 2

Extraction Results for Example 2.
Element Extraction

| Al | Co | Fe | Mg | Mn | Ni |
|---|---|---|---|---|---|
| 0.08% | 94.12% | 1.50% | 0.21% | 0.29% | 96.70% |

While this invention has been described in conjunction with the exemplary aspects outlined above, various alternatives, modifications, variations, improvements, and/or substantial equivalents, whether known or that are or may be presently unforeseen, may become apparent to those having at least ordinary skill in the art. Accordingly, the exemplary aspects of the invention, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

What is claimed is:

1. A process of recovery of base metals from an oxide ore including a first metal selected from the group consisting of iron, magnesium and aluminum, and a second metal selected from the group consisting of nickel, cobalt and copper, the process comprising:

contacting the oxide ore with at least one of ferric or ferrous chloride to form chlorides;

heating the mixture of the oxide ore and the at least one of the ferric or ferrous chloride to decompose the chlorides into hydrochloric acid and hematite;

contacting the hydrochloric acid with base metal oxides of the second metal to form second metal chlorides; and selectively dissolving the second metal chlorides leaving first metal oxides in solid state.

2. The process according to claim 1, wherein, before contacting the oxide ore with at least one of ferric or ferrous chloride, reducing ore particle size from about 2 mm to about 0.050 mm or from about 2 mm to less than 0.5 mm.

3. The process according to claim 1, wherein the ferric chloride is added in a ratio of between 0.05 and 1.5 times an oxide ore mass, or between 0.1 to 0.5 times the oxide ore mass.

4. The process according to claim 1, wherein the ferrous chloride is added in a ratio of between 0.05 and 1.5 times an oxide ore mass, or between 0.1 to 0.5 times the oxide ore mass.

5. The process according to claim 4, wherein an oxidizing agent is added to the oxide ore in a ratio between 0.0001 and 10 times the ore mass to react with the ferrous chloride.

6. The process according to claim 5, wherein the oxidizing agent is selected from the group consisting of oxygen, potassium permanganate, ozone and hydrogen peroxide.

7. The process according to claim 1, wherein the heating is performed at a temperature ranging from about 60° C. to about 600° C., or from about 100° C. to about 300° C.

8. The process according to claim 1, wherein heating is performed for a period of time ranging from about 0.5 hours to about 12 hours.

9. The process according to claim 1, further comprising adding water during the heating of the mixture.

10. The process according to claim 9, wherein the adding of the water further comprises a wet air injection.

11. The process according to claim 1, wherein the oxide ore is stacked in a heap and leached with acidified water comprising hydrochloric acid up to about 100 g/L and at a pH of between about 1 and about 3, at least one of prior to or during selective dissolution of the second metal chlorides.

12. The process according to claim 1, further comprising a solid-liquid separation step after selectively dissolving the second metal chlorides.

13. The process according to claim 12, wherein tailings from the solid-liquid separation step are contacted with a high intensity magnetic field to separate the hematite.

14. The process according to claim 1, further comprising:
contacting recycled hematite with hydrochloric acid by reusing the at least one of the ferric or ferrous chloride; and a reducing agent;

wherein the at least one of ferric and ferrous chloride is regenerated.

15. The process according to claim 14, wherein the reducing agent comprises a metallic iron.

16. The process of claim 1, wherein contacting the oxide ore with the at least one of ferric and ferrous chloride further comprises forming an agglomerated mixture, and wherein the heating further comprises heating the agglomerated mixture.

* * * * *